(12) United States Patent
Wellington et al.

(10) Patent No.: US 7,841,407 B2
(45) Date of Patent: *Nov. 30, 2010

(54) METHOD FOR TREATING A HYDROCARBON CONTAINING FORMATION

(75) Inventors: Scott Lee Wellington, Bellaire, TX (US); Mahendra Ladharam Joshi, Katy, TX (US); Jingyu Cui, Katy, TX (US); Stanley Nemec Milam, Houston, TX (US); Michael Anthony Reynolds, Katy, TX (US)

(73) Assignee: Shell Oil Company, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/425,240

(22) Filed: Apr. 16, 2009

(65) Prior Publication Data

US 2009/0260808 A1 Oct. 22, 2009

Related U.S. Application Data

(60) Provisional application No. 61/046,177, filed on Apr. 18, 2008.

(51) Int. Cl.
*E21B 43/24* (2006.01)
*E21B 43/40* (2006.01)

(52) U.S. Cl. ............... 166/267; 166/266; 166/272.1; 166/272.3; 166/272.4; 166/272.7; 166/302; 166/303

(58) Field of Classification Search ............ None
See application file for complete search history.

(56) References Cited

U.S. PATENT DOCUMENTS

| | | | | |
|---|---|---|---|---|
| 3,456,721 | A | * | 7/1969 | Smith .................. 166/59 |
| 4,379,489 | A | | 4/1983 | Rollmann .............. 166/266 |
| 5,297,626 | A | * | 3/1994 | Vinegar et al. .......... 166/271 |
| 5,404,952 | A | * | 4/1995 | Vinegar et al. .......... 166/303 |
| 5,480,619 | A | | 1/1996 | Johnson et al. .......... 422/168 |
| RE35,696 | E | * | 12/1997 | Mikus .................. 166/303 |
| 7,066,257 | B2 | | 6/2006 | Wellington et al. ...... 166/272.2 |
| 2003/0192693 | A1 | * | 10/2003 | Wellington ............ 166/267 |
| 2008/0135244 | A1 | * | 6/2008 | Miller ................ 166/272.6 |
| 2009/0071652 | A1 | * | 3/2009 | Vinegar ............... 166/303 |
| 2009/0260809 | A1 | * | 10/2009 | Wellington et al. ...... 166/272.1 |

* cited by examiner

*Primary Examiner*—George Suchfield

(57) ABSTRACT

Methods of generating subsurface heat for treating a hydrocarbon containing formation are described herein. The methods include providing a stream that includes water to a plurality of wellbores. Fuel and oxidant is provided to one or more flameless distributed combustors positioned in at least one of the wellbores. The fuel and oxidant is mixed to form a fuel/oxidant mixture. At least a portion of the mixture is flamelessly combusted in at least one of the flameless distributed combustors to generate heat. The fuel includes at least 0.1% hydrogen sulfide by volume.

12 Claims, 8 Drawing Sheets

PRIOR ART

METHOD FOR TREATING A HYDROCARBON CONTAINING FORMATION

CROSS REFERENCE TO RELATED APPLICATIONS

This application claims priority from U.S. Provisional Application Ser. No. 61/046,177 filed Apr. 18, 2008, which is hereby incorporated by reference in its entirety.

FIELD OF THE INVENTION

The present invention relates to methods of treating of a hydrocarbon containing formation.

DESCRIPTION OF RELATED ART

Hydrocarbons obtained from subterranean formations are often used as energy resources, as feedstocks, and as consumer products. Concerns over depletion of available hydrocarbon resources have led to development of processes for more efficient recovery, processing and/or use of available hydrocarbon resources.

Hydrocarbon formations may be treated in various ways to produce formation fluids. For example, application of heat, gases, and/or liquids to hydrocarbon formations to mobilize and/or produce formation fluids has been used to more efficiently recover hydrocarbons from hydrocarbon formations. Hydrocarbon formations containing heavy hydrocarbons—for example, tar sands or oil shale formations—may be heated using heat treatment methods to more efficiently recover hydrocarbons from the heavy hydrocarbon containing formations. Such processes include in situ heat treatment systems, combustion fronts, and drive processes. Typically used hydrocarbon recovery drive processes include, but are not limited to, cyclic steam injection, steam assisted gravity drainage (SAGD), solvent injection, vapor solvent and SAGD, and carbon dioxide injection.

Heaters have been used in hydrocarbon recovery drive processes to create high permeability zones (or injection zones) in hydrocarbon formations. Heaters may be used to create a mobilization geometry or production network in the hydrocarbon formation to allow fluids to flow through the formation during the drive process. For example, heaters may be used: to create drainage paths between the injection wells and production wells for the drive process; to preheat the hydrocarbon formation to mobilize fluids in the formation so that fluids and/or gases may be injected into the formation; and to provide heat to the fluids and/or gases used in the drive process within the hydrocarbon formation. Often, the amount of heat provided by such heaters is small relative to the amount of heat input from the drive process.

Combustion of fossil fuel has been used to heat a formation, for example, by direct injection of hot fossil fuel combustion gases in the formation, by combustion of fossil fuels in the formation (e.g. in a combustion front), by heat transfer from the hot fossil fuel combustion gases to another heat transfer agent such as steam, or by use in heaters located in the hydrocarbon formation. Combustion of fossil fuels to heat a formation may take place in the formation, in a well, and/or near the surface. Combustion of fossil fuel generates carbon dioxide, an undesirable greenhouse gas, as a combustion by-product.

In situ heating of a selected section of a hydrocarbon formation has been used for directed heating of portions of a hydrocarbon formation. U.S. Pat. No. 7,066,257 to Wellington et al describes an in situ treatment of a formation that includes heating a selected section of a hydrocarbon formation with one or more heat sources and one or more cycles of steam injection. A vapor mixture, which may include pyrolysis fluids, may be produced from the formation through one or more production wells in the formation. The heat sources may include natural distributed combustors that are fueled by methane, ethane, hydrogen, or synthesis gas. Fluid produced from the formation may include hydrogen sulfide. The hydrogen sulfide produced from the formation may be used to produce, for example, sulfuric acid, fertilizer, and/or elemental sulfur.

An efficient, cost effective method for treating a hydrocarbon formation to more efficiently recover hydrocarbons from the hydrocarbon formation without the production of large quantities of carbon dioxide is desirable.

SUMMARY OF THE INVENTION

The present invention is directed to a method of treating a hydrocarbon formation comprising providing a stream comprising water to a plurality of wellbores positioned in a hydrocarbon containing formation; providing a fuel stream and an oxidant stream to one or more flameless distributed combustors positioned in at least one of the wellbores, where the fuel stream has a hydrogen sulfide content of at least 0.1% hydrogen sulfide by volume; mixing at least a portion of the fuel stream and at least a portion of the oxidant stream to form a fuel/oxidant mixture; and flamelessly combusting at least a portion of the fuel/oxidant mixture in at least one of the flameless distributed combustors to generate heat.

BRIEF DESCRIPTION OF THE DRAWINGS

Further, advantages of the present invention may become apparent to those skilled in the art with the benefit of the following detailed description of the preferred embodiments and upon reference to the accompanying drawings in which.

Figure 1:
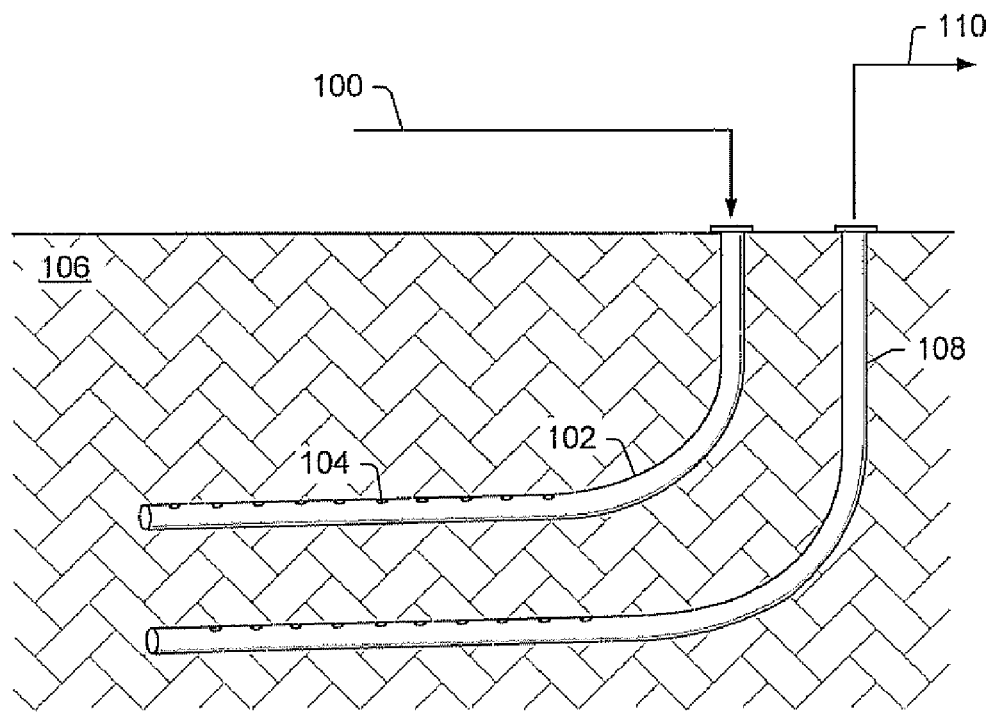
FIG. 1 depicts a representation of a steam drive process.

While the invention is susceptible to various modifications and alternative forms, specific embodiments thereof are shown by way of example in the drawings. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

The present invention is directed to a process for providing heat to a hydrocarbon formation. In the process, water is provided to a plurality of wellbores that are positioned in a portion of the hydrocarbon formation, where the water may be in the form of liquid, steam, or superheated steam. A mixture of at least a portion of an oxidant stream and at least a portion of a fuel stream comprised of at least 0.1 vol. % hydrogen sulfide is combusted in one or more flameless distributed combustors positioned in one or more of the wellbores to which the water is provided. Heat from the combustion of the mixture is transferred to at least a portion of the water. Heat may be transferred from the heated water to a portion of the hydrocarbon formation to heat the hydrocarbon formation and mobilize fluids in the formation. The mobilized formation fluids may then be recovered from the hydrocarbon formation. Since the fuel stream is sulfur based, production of carbon dioxide is avoided upon combustion of the sulfide components of the fuel stream, reducing the overall production of carbon dioxide of the heating process relative to processes that utilize a fuel stream comprised mostly of hydrocarbons.

The process of oxidizing hydrogen sulfide through a combustion process to produce sulfuric acid may have a heat value similar to methane combustion. For example, using data from "The Chemical Thermodynamics of Organic Compounds" by Stull et al., Kreiger Publishing Company, Malabar Fla., 1987, pp. 220, 229, 230, 233 and 234, the enthalpies of reaction for the combustion of methane and hydrogen sulfide can be calculated. Combustion of methane produces carbon dioxide as a by-product, as shown by the following reaction:

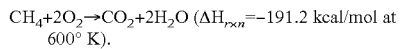
$$CH_4 + 2O_2 \rightarrow CO_2 + 2H_2O \ (\Delta H_{rxn} = -191.2 \text{ kcal/mol at } 600° \text{ K}).$$

In contrast, oxidation (combustion) of hydrogen sulfide to form sulfuric acid has a calculated reaction enthalpy as shown in the following reaction:

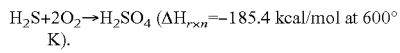
$$H_2S + 2O_2 \rightarrow H_2SO_4 \ (\Delta H_{rxn} = -185.4 \text{ kcal/mol at } 600° \text{ K}).$$

More heat may be generated upon mixing the sulfuric acid in water from the heat of solution of sulfuric acid in water as shown below:

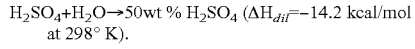
$$H_2SO_4 + H_2O \rightarrow 50\text{wt\% } H_2SO_4 \ (\Delta H_{dil} = -14.2 \text{ kcal/mol at } 298° \text{ K}).$$

The total amount of heat content produced from the combustion of hydrogen sulfide and the dissolution of the sulfuric acid may range from −185 kcal/mol to −206 kcal/mol depending on the amount of water used to produce the sulfuric acid. Combustion of hydrogen sulfide as a fuel instead of methane in accordance with the process of the present invention, therefore, provides heat to a hydrocarbon formation in an amount comparable to the combustion of methane while producing no carbon dioxide. Furthermore, the use of fuels containing hydrogen sulfide in the process of the present invention provides a method to dispose of waste hydrogen sulfide from other processes (for example, sour gas and/or hydrotreating effluent streams) without creating elemental sulfur.

Terms used herein are defined as follows.

"API gravity" refers to API gravity at 15.5° C. (60° F.). API gravity is as determined by ASTM Method D6822 or ASTM Method D1298.

"ASTM" refers to American Standard Testing and Materials.

A "formation" includes one or more hydrocarbon containing layers, one or more non-hydrocarbon layers, an overburden, and/or an underburden. "Hydrocarbon layers" refer to layers in the formation that contain hydrocarbons. The hydrocarbon layers may contain non-hydrocarbon material and hydrocarbon material. The "overburden" and/or the "underburden" include one or more different types of hydrocarbon impermeable materials. In some cases, the overburden and/or the underburden may be somewhat permeable to hydrocarbon materials.

"Formation fluids" refer to fluids present in a formation and may include pyrolysis fluid, synthesis gas, mobilized hydrocarbons, and water (steam). Formation fluids may include hydrocarbon fluids as well as non-hydrocarbon fluids. The term "mobilized fluid" refers to fluids in a hydrocarbon containing formation that are able to flow as a result of treatment of the formation. "Produced fluids" refer to fluids removed from the formation.

A "heater" is any system or heat source for generating heat in a well or a near wellbore region. Heaters may be, but are not limited to, electric heaters, burners, combustors that react with material in or produced from a formation, and/or combinations thereof. "Flameless distributed combustor" refers to a substantially flameless heater where an oxidant stream and a fuel stream are mixed together over at least a portion of the distributed length of the heater at or above an auto-ignition temperature of the mixture.

"Heavy hydrocarbons" are viscous hydrocarbon fluids. Heavy hydrocarbons may include highly viscous hydrocarbon fluids such as heavy oil, tar, and/or asphalt. Heavy hydrocarbons may include carbon and hydrogen, as well as smaller concentrations of compounds containing sulfur, oxygen, and nitrogen. Additional elements (for example, nickel, iron, vanadium, or mixtures thereof) may also be present in heavy hydrocarbons. Heavy hydrocarbons may be classified by API gravity. Heavy hydrocarbons generally have an API gravity below about 20. Heavy oil, for example, generally has an API gravity of about 10-20, whereas tar generally has an API gravity below about 10. The viscosity of heavy hydrocarbons is generally at least 100 centipoise at 15° C. Heavy hydrocarbons may include aromatics or other complex ring hydrocarbons.

"Hydrocarbons" are generally defined as molecules formed primarily by carbon and hydrogen atoms. Hydrocarbons as used herein may also include metallic elements and/or other compounds that contain, but are not limited to, halogens, nitrogen, oxygen, and/or sulfur. Hydrocarbon compounds that contain sulfur are referred to as "organosulfur compounds." Hydrocarbons may be, but are not limited to, kerogen, bitumen, pyrobitumen, oils, natural mineral waxes, and asphaltites. Hydrocarbons may be located in or adjacent to mineral matrices in the earth. Matrices may include, but are not limited to, sedimentary rock, sands, silicilytes, carbonates, diatomites, and other porous media. "Hydrocarbon fluids" are fluids that include hydrocarbons. Hydrocarbon fluids may include, entrain, or be entrained in non-hydrocarbon fluids such as hydrogen, nitrogen, carbon monoxide, carbon dioxide, hydrogen sulfide, sulfur oxides, carbonyl sulfide, nitrogen oxide, water, ammonia, or mixtures thereof.

"Oxidant" refers to compounds suitable to support combustion. Examples of oxidants include air, oxygen, and/or enriched air. "Enriched air" refers to air having a larger mole fraction of oxygen than air in the atmosphere. Air is typically enriched to increase combustion-supporting ability of the air.

"SAGD" is steam assisted gravity drainage.

"Tar" is a viscous hydrocarbon that generally has a viscosity greater than about 10,000 centipoise at 15° C. The specific gravity of tar generally is greater than 1.000. Tar may have an API gravity less than 10°.

"Tar sands formation" refers to a formation in which hydrocarbons are predominantly present in the form of heavy hydrocarbons and/or tar entrained in a mineral grain framework or other host lithology (for example, sand or carbonate). Examples of tar sands formations include formations such as the Athabasca formation, the Grosmont formation, and the Peace River formation, all three in Alberta, Canada; and the Faja formation in the Orinoco belt in Venezuela.

"Water" refers to the liquid and vapor phases of water. For example, water, steam, super-heated steam.

In the process of the invention, a stream comprising water is provided through a plurality of wellbores to a hydrocarbon formation. The wellbores may be spaced apart relative to each other for optimal mobilization of formation fluids in the hydrocarbon formation as a result of the water stream provided to the hydrocarbon formation through the wellbores. The water stream may be provided to at least a portion of the hydrocarbon containing formation from a plurality of locations within a wellbore. The water stream provided to the hydrocarbon formation may have a higher temperature than the portion of the hydrocarbon formation to which the stream is provided.

A fuel stream comprising at least 5 vol. % hydrogen sulfide and an oxidant stream are provided to one or more heaters comprising one or more flameless distributed combustors located in the one or more wellbores in which the water stream is provided to the hydrocarbon formation. The fuel stream may include from 0.1% to 100%, from 5% to 90%, from 10% to 80%, or from 20% to 50% of hydrogen sulfide by volume, or may include at least 5%, or at least 10%, or at least 20%, or at least 30%, or at least 40%, or at least 50% hydrogen sulfide by volume. Hydrogen sulfide content in a stream may be measured using ASTM Method D2420. The fuel stream comprising hydrogen sulfide may include hydrocarbons (for example, methane, and ethane), hydrogen, carbon dioxide, or mixtures thereof. In some embodiments, the fuel stream may include organosulfur compounds. Examples of organosulfur compounds include, but are not limited to, methyl thiol, thiophene, thiophene compounds, carbon disulfide, carbonyl sulfide, or mixtures thereof. The use of fuels containing hydrogen sulfide and/or organosulfur compounds may allow from 0.3 moles to 1 mole of methane to be conserved per mole of atomic sulfur in the fuel.

The oxidant stream provided to the one or more heaters comprising one or more flameless distributed combustors located in the one or more wellbores to which the fuel stream is provided contains sufficient oxygen so that a mixture of the fuel stream and the oxidant stream may be flamelessly combusted. The oxidant stream may be compressed air, oxygen-enriched air, or substantially pure oxygen gas.

At least a portion of the fuel stream and a portion of the oxidant stream are mixed to provide a fuel/oxidant mixture that is combusted. At least a portion of the fuel stream and the oxidant stream may be mixed in one or more heaters in the one or more wellbores to which the fuel stream and the oxidant stream are provided. In an embodiment of the process of the present invention, at least a portion of the fuel stream and the oxidant stream may be mixed prior to being provided to the one or more heaters, either in the wellbore and/or at the surface of the hydrocarbon formation prior to entering the wellbore.

The mixture of the fuel stream and the oxidant stream may then be combusted in the heaters in one or more wellbores to which the water is provided. The mixture of the fuel stream and the oxidant stream may be combusted by raising the temperature of the mixture to at or above the autoignition temperature of the mixture, typically from 250° C. to 1000° C., or from 260° C. to 900° C., or from 300° C. to 800° C.—where the autoignition temperature of hydrogen sulfide is 260° C. As described further herein, at least a portion of the mixture is combusted in the heaters by flameless distributed combustion, and a portion of the mixture may be combusted in the heaters by burning the mixture. Combustion of the mixture of the fuel stream and the oxidant stream by flameless distributed combustion or by a combination of flameless distributed combustion and burning generates heat.

Heat from the combustion of the fuel stream and the oxidant stream may be transferred to the water stream in the wellbore to increase the temperature of the water stream in the wellbore. Transfer of the heat of combustion of the fuel stream and the oxidant stream raises the temperature of the water and may transform the water to steam and/or superheated steam if the water is not already steam or superheated steam.

Heat from the heated stream of water/steam may then be transferred to a portion of the hydrocarbon formation to mobilize formation fluids in the hydrocarbon formation. The heat from the heated stream of water/steam may be transferred to portions of the hydrocarbon formation at one or more locations along the wellbore as described further herein. The heated stream of water/steam may be injected into the hydrocarbon formation to transfer heat from the heated stream of water/steam to the hydrocarbon formation and/or heat from the stream of heated water/steam may be transferred to the hydrocarbon formation indirectly by transferring heat from the heated stream of water/steam to the wellbore and then transferring heat from the heated wellbore to the hydrocarbon formation. Heat from the heated stream of water/steam may also be transferred to the hydrocarbon formation by injecting the heated stream of water/steam into the hydrocarbon formation at the terminus of the wellbore.

Formation fluids mobilized by transfer of heat from the heated stream of water/steam may be recovered from the hydrocarbon formation. For example, the stream of water may be heated by combustion of the mixture of the fuel stream and the oxidant stream in an injection well to mobilize formation fluids proximate to the injection well, and the mobilized formation fluids may be recovered in a production well located in a position relative to the injection well to collect the formation fluids mobilized by heating the hydrocarbon formation at a position proximate to the injection well.

In an embodiment of the process of the invention, the process may be utilized in conjunction with a drive process to treat a hydrocarbon formation. Such drive processes include, but are not limited to, steam injection processes such as cyclic steam injection, SAGD, solvent injection, a vapor solvent and SAGD process, or carbon dioxide injection. The process of the invention may be used to preheat a hydrocarbon formation for a drive process, or may be used o provide heat during or after a drive process.

FIG. 1 depicts a representation of a steam drive process in which the process of the present invention may be utilized. Hot water (steam) 100 enters injection well 102. Water 100 may be injected at temperatures ranging from 80° C. to 500°

C., preferably 100° C. to 270° C., and pressures ranging from 1 MPa to 15 MPa. Injection well 102 may include openings 104 to allow water 100 to flow and/or be pressurized into hydrocarbon layer 106. Water 100 provides heat to formation fluids in the hydrocarbon layer 106. Heating the formation fluids may mobilize the formation fluids to promote drainage of the formation fluids towards production well 108 positioned below injection well 102. Water 100 is provided to a plurality of injection wells 102 located to optimize production of formation fluids 110 for recovery in the production well 108. Formation fluid 110 is produced from production well 108 and transported to one or more processing facilities.

Heaters may be positioned in the injection well 102 in which a fuel stream comprising hydrogen sulfide may be combusted with an oxidant according to the process of the invention to provide further heat to the hydrocarbon formation to further mobilize the formation fluids 110. Combustion by-products containing sulfur oxides may mix with the steam from the injection well in the hydrocarbon formation to provide even further heat to the hydrocarbon formation by releasing the heat of solution formed upon contact of the sulfur oxides with the steam into the hydrocarbon formation.

Figure 2:
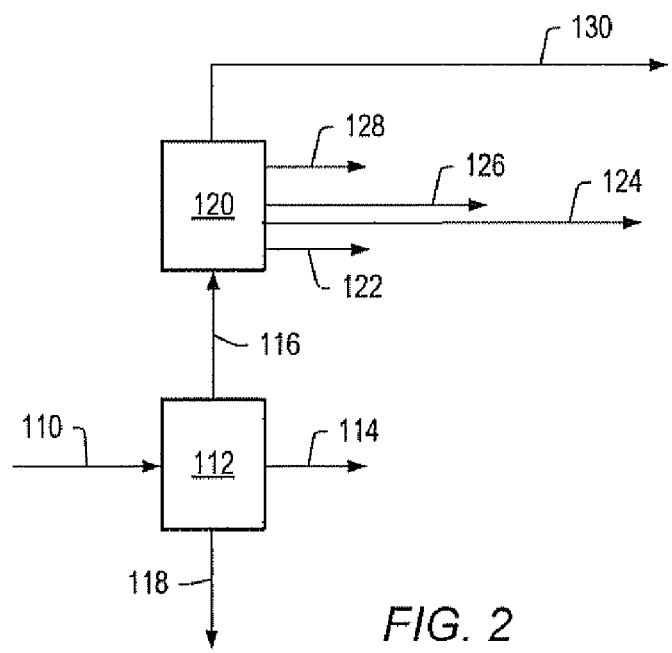
FIG. 2 depicts a schematic representation of an embodiment of treatment of formation fluids produced from a hydrocarbon formation.

In the process of the present invention, a fuel stream comprising hydrogen sulfide that is provided to a heater may produced from a hydrocarbon containing formation. FIG. 2 depicts a schematic representation of treatment of formation fluids produced from a hydrocarbon formation. Produced formation fluid 110 enters fluid separation unit 112 and is separated into liquid stream 114, gas stream 116, and aqueous stream 118. Produced formation fluid 110 may obtained from a hydrocarbon formation that is primarily a gas reservoir or from a hydrocarbon formation that is primarily a liquid hydrocarbon reservoir. Liquid stream 114 may be transported to other processing units and/or storage units. Gas stream 116 may include, but is not limited to, hydrocarbons, carbonyl sulfide, hydrogen sulfide, sulfur oxides, organosulfur compounds, hydrogen, carbon dioxide, or mixtures thereof. Gas stream 116 may enter gas separation unit 120 to separate at least a portion of a gas hydrocarbon stream 122, at least a portion of a hydrogen sulfide stream 124, at least a portion of a carbon dioxide stream 126, at least a portion of a sulfur dioxide stream 128, and at least a portion of a hydrogen stream 130 from the gas stream 116.

One or more streams containing hydrogen sulfide from a variety of sources, including the gas stream 116 from the hydrocarbon formation, may be combined and sent to a gas separation unit to produce the fuel stream comprising hydrogen sulfide utilized in the process of the present invention. For example, streams from gas reservoirs, liquid hydrocarbon reservoirs, and/or streams from surface facilities may be combined as a feedstream for the gas separation unit from which a hydrogen sulfide enriched gas may be separated. The resulting hydrogen sulfide stream 124 may be stored and/or combined with one or more hydrogen sulfide streams produced from other gas separation units and/or other processing facilities to form a fuel stream comprising hydrogen sulfide for use in the process of the present invention.

Gas separation units 120 useful for forming the fuel stream comprising hydrogen sulfide utilized in the process of the present invention may include physical treatment systems and/or chemical treatment systems. Physical treatment systems include, but are not limited to, a membrane unit, a pressure swing adsorption unit, a liquid absorption unit, and/or a cryogenic unit. Chemical treatment systems may include units that use amines (for example, diethanolamine or di-isopropanolamine), zinc oxide, sulfolane, water, or mixtures thereof in the treatment process. In some embodiments, gas separation unit 120 uses a Sulfinol gas treatment process for removal of sulfur compounds. Carbon dioxide may be removed using Catacarb® (Catacarb, Overland Park, Kans., U.S.A.) and/or Benfield (UOP, Des Plaines, Ill., U.S.A.) gas treatment processes. The gas separation unit may be a rectified adsorption and high pressure fractionation unit.

The fuel stream comprising hydrogen sulfide used in the process of the present invention may include from 0.1% to 100%, from 5% to 90%, from 10% to 80%, or from 20% to 50% of hydrogen sulfide by volume, or may include at least 5%, or at least 10%, or at least 20%, or at least 25%, or at least 30%, or at least 40%, or at least 50% hydrogen sulfide by volume. In an embodiment of the process of the invention, produced formation fluids from a hydrocarbon formation including hydrogen sulfide stream 124 in combination with gas stream 116, hydrogen stream 130, and/or gas hydrocarbon stream 122 may be used as a fuel stream comprising hydrogen sulfide. The fuel stream comprising hydrogen sulfide may be dried to remove moisture to improve the combustibility of the fuel stream. For example, the fuel stream comprising hydrogen sulfide may be dried by contacting the hydrogen sulfide stream with ethylene glycol to remove water.

In the process of the present invention, the oxidant with which the fuel stream comprising hydrogen sulfide is combusted is an oxygen-containing gas or liquid. The oxidant is preferably selected from compressed air, oxygen-enriched air, or oxygen gas. Compressed air may be provided as the oxidant in the process of the invention by compressing air by conventional air compressing processes, for example, air may be compressed by passing the air through a turbine compressor. Oxygen-enriched air, which may contain from 0.5 vol. % to 15 vol. % more oxygen than air, may be produced by compressing air and passing the compressed air through a membrane that increases the amount of oxygen in the air. Oxygen gas may be provided as the oxidant by conventional air separation technology.

In some embodiments, the ratio of hydrogen sulfide to oxidant is controlled during the combustion process. By selecting the amount of hydrogen sulfide relative to the amount of oxidant present—on the basis of atomic sulfur to atomic oxygen ratio or on a stoichiometric basis—and adjusting the amount of hydrogen sulfide to the selected amount, the amount of hydrogen sulfide in the combustion and the composition of the combustion by-products produced (for example, sulfur dioxide and/or sulfur trioxide) may be controlled. The amount of the fuel stream comprising hydrogen sulfide may be controlled and/or the amount the oxidant stream may be controlled to produce a selected ratio of hydrogen sulfide to oxidant for combustion such that a preferred combustion by-product stream composition is produced.

The amounts of the fuel stream comprising hydrogen sulfide and the oxidant stream provided for combustion in the process of the present invention may be controlled in a manner such that combustion generates substantially sulfur trioxide in the combustion by-product stream. To produce a sulfur trioxide-rich combustion by-product stream, the ratio of hydrogen sulfide to oxidant may be controlled so that excess oxidant is combusted with the fuel stream comprising hydrogen sulfide relative to the hydrogen sulfide content of the fuel stream. Combusting a hydrogen sulfide lean mixture produces more sulfur trioxide than sulfur dioxide as a combustion by-product. The sulfur trioxide may react with water in the hydrocarbon formation to form sulfuric acid. Sulfur trioxide is readily converted to sulfuric acid, thus heat of solution may be produced and delivered to the hydrocarbon formation more rapidly than when hydrogen sulfide is combusted at a stoichiometric amount or deficient amount relative to the amount of oxidant.

Alternatively, the amounts of the fuel stream comprising hydrogen sulfide and the oxidant steam provided for combustion in the process of the present invention may be controlled in a manner such that combustion generates substantially sulfur dioxide in the combustion by-product stream. To produce a sulfur dioxide-rich combustion by-product stream, the ratio of hydrogen sulfide to oxidant may be controlled so that a deficient amount of oxidant is combusted with the fuel stream comprising hydrogen sulfide relative to the hydrogen sulfide content of the fuel stream. Using an excess of hydrogen sulfide relative to oxidant produces a combustion by-products stream rich in sulfur dioxide that also contains hydrogen sulfide, and allows hydrogen sulfide and/or sulfur dioxide to be introduced into a layer of the hydrocarbon containing formation. A portion of the hydrogen sulfide and/or sulfur dioxide may contact at least a portion of the formation fluids and solvate and/or dissolve a portion of the heavy hydrocarbons in the formation fluids. Solvation and/or dissolution of at least a portion the heavy hydrocarbons may facilitate movement of the heavy hydrocarbons towards the production well. Furthermore, introduction of at least a portion of the combustion by-product stream comprising sulfur dioxide into the formation fluids may increase a shear rate applied to hydrocarbon fluids in the formation and decrease the viscosity of non-Newtonian hydrocarbon fluids within the formation. The introduction of the sulfur dioxide rich combustion by-products stream into the formation may thereby increase a portion of the formation available for production, and may increase a ratio of energy output of the formation (energy content of products produced from the formation) to energy input into the formation (energy costs for treating the formation).

In a further alternative, the amounts of the fuel stream comprising hydrogen sulfide and the oxidant provided for combustion in the process of the present invention may be controlled to provide stoichiometrically equivalent amounts of hydrogen sulfide and the oxidant. Combustion of a stoichiometric amount of hydrogen sulfide with oxygen may generate predominately sulfur dioxide and water as the combustion by-products as shown in the following reaction:

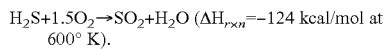
$H_2S + 1.5O_2 \rightarrow SO_2 + H_2O$ ($\Delta H_{rxn} = -124$ kcal/mol at 600° K).

In addition to the heat value that is obtained from combustion of hydrogen sulfide, the introduction of heated sulfur dioxide/water combustion by-product stream into the hydrocarbon formation may facilitate recovery of hydrocarbons from the formation. The heat from the sulfur dioxide may transfer heat to fluids in the formation and the heated fluids may flow towards production wells. Furthermore, as discussed above, the sulfur dioxide in the combustion by-product stream may reduce the viscosity of hydrocarbon formation fluids in the hydrocarbon formation and thereby increase the amount of hydrocarbons available to be recovered from the formation. The heat of solution of sulfur dioxide, although less than the heat of solution of sulfuric acid, may also be transferred to the formation fluids of the hydrocarbon formation thereby mobilizing the formation fluids.

The combustion of the fuel stream comprising hydrogen sulfide and the oxidant is effected in one or more heaters positioned in each of the one or more wellbores through which water is provided to the hydrocarbon formation. One or more of the heaters are flameless distributed combustors, and in an embodiment of the invention all of the heaters are flameless distributed combustors. Alternatively, at least some of the heaters may be burners, so the mixture may be combusted by both flameless distributed combustion in a portion of the heaters and by burning in the remaining heaters.

In a preferred embodiment, each heater is a flameless distributed combustor in which the fuel stream comprising hydrogen sulfide and the oxidant are flamelessly combusted. In a flameless distributed combustor, the oxidant stream is provided in the heater at a velocity that is sufficiently elevated to prevent the formation of a fixed diffusion flame upon combustion of the mixture of the oxidant and the fuel stream in the heater, thereby ensuring a controlled heat release along the length of the flameless distributed combustor.

In operating a flameless distributed combustor heater to combust the fuel stream comprising hydrogen sulfide and the oxidant stream, the fuel stream and the oxidant are mixed, where the mixture of the fuel stream and the oxidant is heated to a temperature at or above the auto-ignition temperature of the mixture, typically from 250° C. to 800° C., or from 300° C. to 750° C., or from 400° C. to 700° C. Prior to mixing the oxidant stream and the fuel stream comprising hydrogen sulfide in the heater, the oxidant stream, the fuel stream, or both may be pre-heated to a temperature sufficient to bring the mixture to a temperature at or above the auto-ignition temperature of the mixture upon mixing. The oxidant stream and/or the fuel stream comprising hydrogen sulfide may be pre-heated by heat exchange with a heat source, for example, steam or superheated steam. Alternatively, the fuel stream comprising hydrogen sulfide and the oxidant stream may be mixed and ignited using an ignition device—such as a spark plug or a glow plug—that facilitates raising the temperature of the mixture to at or above the auto-ignition temperature of the mixture.

If the process is not limited to the use of flameless combustion, at least one or more heaters may be a burner that produces a flame. In operating a burner, the fuel stream comprising hydrogen sulfide and the oxidant stream are provided to the burner for combustion. The fuel stream and the oxidant stream may be mixed in the burner or may be mixed prior to being provided to the burner. The mixture of the fuel stream and the oxidant stream is combusted by raising the temperature of the mixture to a temperature at or above the auto-ignition temperature of the mixture, for example, by igniting the mixture with an ignition device such as a spark plug or a glow plug. The oxidant stream and the fuel stream comprising hydrogen sulfide are provided to the burner at a velocity such that a stable flame may be produced by the burner. The burner may include flame stabilizing shields near the burner flame to assist in stabilizing the flame after ignition.

As noted above, in the process of the present invention a stream comprising water is provided to at least a portion of the hydrocarbon containing formation through one or more of the wellbores in which the fuel stream comprising hydrogen sulfide and the oxidant stream are combusted. The stream comprising water provided to the one or more wellbores may be in the form of steam or superheated steam.

At least a portion of the stream comprising water supplied to a wellbore is heated subsurface by the heat generated by the combustion of the fuel stream comprising hydrogen sulfide and the oxidant stream. The heat generated by combustion of the fuel stream comprising hydrogen sulfide and the oxidant stream may be thermally communicated to a portion of the stream comprising water in the wellbore. The heated portion of stream comprising water may be in thermal communication with a portion of the hydrocarbon formation so that heat may be transferred from the heated portion of the stream comprising water to the hydrocarbon formation to provide a driving force for mobilization of at least a portion of the formation fluids in the hydrocarbon formation. The heated portion of the stream comprising water may be in thermal communication with the hydrocarbon formation along the length of the wellbore, and the heated portion of the stream comprising water may be injected into the hydrocarbon formation along the length of the wellbore and/or at the terminus of the wellbore.

Combustion of the fuel stream comprising hydrogen sulfide and the oxidant stream is used for subsurface heating of the stream comprising water in the wellbore of the injection well. The water (steam) may be heated subsurface by combustion of a stream containing hydrogen sulfide in a subsurface section of the wellbore of the injection well. Heat from the subsurface combustion may enhance heat transfer to the hydrocarbon formation due to the generation of higher steam temperatures subsurface, thus the heat transfer region or "region of influence" (ROI) may be enlarged as compared to conventional steam drive processes. For example, subsurface heating using hydrogen sulfide may produce a combustion product stream having a temperature from about 500° C. to about 2000° C., which heats the water and/or hydrocarbon layer. In contrast, conventional steam injection methods may produce steam temperatures of about 290° C. for heating the hydrocarbon layer.

Subsurface heating of water (steam) supplied to an injection well may inhibit water condensation along the length of the injection well. Inhibiting water condensation in the injection well may enhance heating and allow more uniform heating of the hydrocarbon layer. Subsurface heating of steam may lessen the amount of steam required to be injected to heat the hydrocarbon layer, for example by lessening the amount of premature steam condensation. In some embodiments, water re-cycling facilities are reduced due to more efficient use of the steam. Subsurface heating of water may reduce or eliminate the requirement for hydrocarbon gases at the well site as an energy source, thereby allowing additional hydrocarbon gases to be sold for commercial and/or residential energy sources.

The heated portion of the stream comprising water may be used to sustain the combustion of the fuel stream comprising hydrogen sulfide and the oxidant stream in the wellbore downstream of the transfer of heat from the combustion to the stream comprising water. The stream comprising water may be heated to a temperature at or above the auto-ignition temperature of the mixture of the fuel stream and the oxidant stream by transfer of heat from the combustion to the stream comprising water. The flow of the heated stream comprising water may be directed into the wellbore (downstream from the wellhead) and heat may be transferred from the heated stream comprising water to a mixture of the fuel stream comprising hydrogen sulfide and the oxidant stream downstream of the transfer of heat from the combustion to the stream comprising water, where the heat transferred from the heated stream comprising water to the downstream mixture of the fuel stream and the oxidant stream is sufficient to heat the mixture to a temperature at or above the auto-ignition temperature of the mixture so that the mixture combusts to provide further heat. The mixture of the fuel stream and the oxidant stream may be supplied to one or more heaters at a plurality of locations in the wellbore so that combustion may occur at a plurality of locations along the length of the wellbore.

The water in the wellbore or exiting the wellbore into the hydrocarbon formation may be heated by contact with at least a portion of the combustion by-products stream. The combustion by-products stream may directly transfer heat from the combustion to a least a portion of the water and the combustion by-products stream may generate a heat of solution upon being mixed with the water, particularly if the combustion by-products stream contains significant amounts of sulfur trioxide that may be converted to sulfuric acid upon mixing with the water. The water heated by the combustion by-products stream may transfer heat to a portion of the hydrocarbon formation to provide a driving force for mobilization of at least a portion of the formation fluids.

Combustion by-products from surface facilities may be introduced into the stream comprising water being provided to a wellbore. Heat from the heaters may provide heat to the combustion by-products from the surface facilities to facilitate driving such combustion by-products into the formation. The stream comprising water/steam provided to the wellbore may be initially heated using combustion by-products from surface facilities. The stream comprising water provided to the one or more wellbores may also include carbon dioxide, sulfur dioxide, combustion by-products from surface facilities, or mixtures thereof. In particular, carbon dioxide may be sequestered in the hydrocarbon formation by injecting the carbon dioxide in a wellbore, where heat from the combustion of the fuel stream comprising hydrogen sulfide and the oxidant stream provides heat to the injected carbon dioxide to facilitate driving the carbon dioxide into the hydrocarbon formation.

Heat may be transferred to fluids introduced into the formation, formation fluids and/or to a portion of the hydrocarbon containing formation through heat of reaction, heat of salvation, conductive heat, or convective heat. Fluids introduced into the formation and/or combustion by-products may transfer heat to at least a portion of the hydrocarbon containing formation and/or formation fluids.

Convective heat transfer may occur when non-condensable non-miscible gases such as nitrogen contact the formation fluids and/or hydrocarbon containing formation. When the oxidant stream is formed of compressed air or oxygen-enriched air, the combustion by-products may include nitrogen gas. Convective heat transfer may also occur when superheated miscible solvent vapors (for example, hydrogen sulfide, carbon dioxide, and/or sulfur dioxide vapors) contact the formation fluids and/or hydrocarbon containing formation. Convective heat transfer may also occur when superheated non-miscible solvent vapors such as water contact the formation fluids and/or hydrocarbon containing formation.

Conductive heat transfer may occur when hot liquid steam condensate contacts the formation fluids and/or hydrocarbon containing formation. Conductive heat transfer may occur when hot liquid miscible solvent (for example, hydrogen sulfide, carbon dioxide, and/or sulfur dioxide) contacts the formation fluids and/or hydrocarbon containing formation.

Heat of reaction heat transfer may occur when one compound reacts with another compound. For example, sulfur oxides form solutions with liquid water in the hydrocarbon containing formation and/or in the outer portion of the wellbore to generate a heat of reaction. Heat of reaction also occurs as oxygen reacts with hydrocarbons or sulfur compounds to form carbon oxides or sulfur oxides.

Heat of solution may occur when at least one component is dissolved in a solvent. For example, heat is generated when sulfuric acid is dissolved in water.

The stream comprising water may be provided in a first portion of a wellbore, for example a first conduit, and combustion of the fuel stream comprising hydrogen sulfide and the oxidant stream may occur in a second portion of the wellbore, for example a heater located in a second conduit. The second portion of the wellbore may be in thermal communication with the first portion of the wellbore so that heat from the combustion of the fuel stream and the oxidant stream may be transferred from the second portion of the wellbore to the stream comprising water/steam flowing in the first portion of the wellbore. The first portion of the wellbore may be in thermal communication with a portion of the hydrocarbon formation so that heat from heated stream comprising water/steam may be transferred from the heated stream comprising water/steam to the portion of the hydrocarbon formation in thermal communication with the first portion of the wellbore. The first portion of the wellbore may be in thermal communication with the hydrocarbon formation along the length of the wellbore. The first portion of the wellbore may also be in thermal communication with the hydrocarbon formation at the terminus of the wellbore in the hydrocarbon formation, where the stream comprising water/steam may be injected into the hydrocarbon formation.

In some embodiments, the heater is positioned in an inner portion of a wellbore. An outer portion of the wellbore may allow addition of a stream that includes water (for example, a drive fluid or a solvent) and/or heating of the stream as it is introduced into the hydrocarbon containing formation. The heater may be positioned in an inner conduit coupled to an outer conduit. The two conduits may be placed in the wellbore. The conduits may be side by side. It should be understood that any number and/or configuration contemplated configuration of conduits may be used as contemplated or desired.

Fuel may be provided to one or more fuel conduits, where at least one of the conduits provides a portion of the fuel comprising hydrogen sulfide and at least one of the conduits provides another fuel. The fuel may be provided to one or more fuel conduits in at least one of the heaters such that at least a portion of the fuel is introduced to an upstream portion of at least one of the heaters and at least a portion of the fuel stream is introduced to a downstream portion of at least one of the heaters. The fuel may be provided to one or more fuel conduits in at least one of the heaters, where at least one of the conduits is adjustable such that at least a portion of the fuel is delivered to a first portion of the heater and then to a second portion of the heater downstream of the first portion.

Passing of a fluid (for example, a stream that includes water) through the outer portion of the wellbore and into the hydrocarbon containing formation may move or drive the formation fluids to a production well. The fluid may contact the formation fluids and mix with a portion of the formation fluids, solvate a portion of the formation fluids and/or dissolve a portion of the hydrocarbons. Contacting of the fluid with the formation fluids may lower the viscosity the formation fluids and promote movement of the formation fluids towards one or more production wells.

Heat generated from the heater in the inner portion of the wellbore may heat at least a portion the fluid passing through the outer portion of the wellbore. Heat may also be generated by contact or reaction of the combustion by-products produced from the heater with the fluid passing through the outer portion of the wellbore. The combustion by-products may move or drive the fluid in the outer conduit into the hydrocarbon containing formation. In some embodiments, combustion generates combustion by-products that include sulfur dioxide. At least a portion of formation fluids in the hydrocarbon containing formation may mix with the generated sulfur dioxide to form a mixture.

In some embodiments, transferring heat to at least a portion of the fluid passing through the outer portion may sustain oxidation and heat along portions of the heater along the length of the heater. Sustaining heat along a portion of the heater may enhance stability of the heater at oxidation temperatures under all operating conditions.

Figure 5:
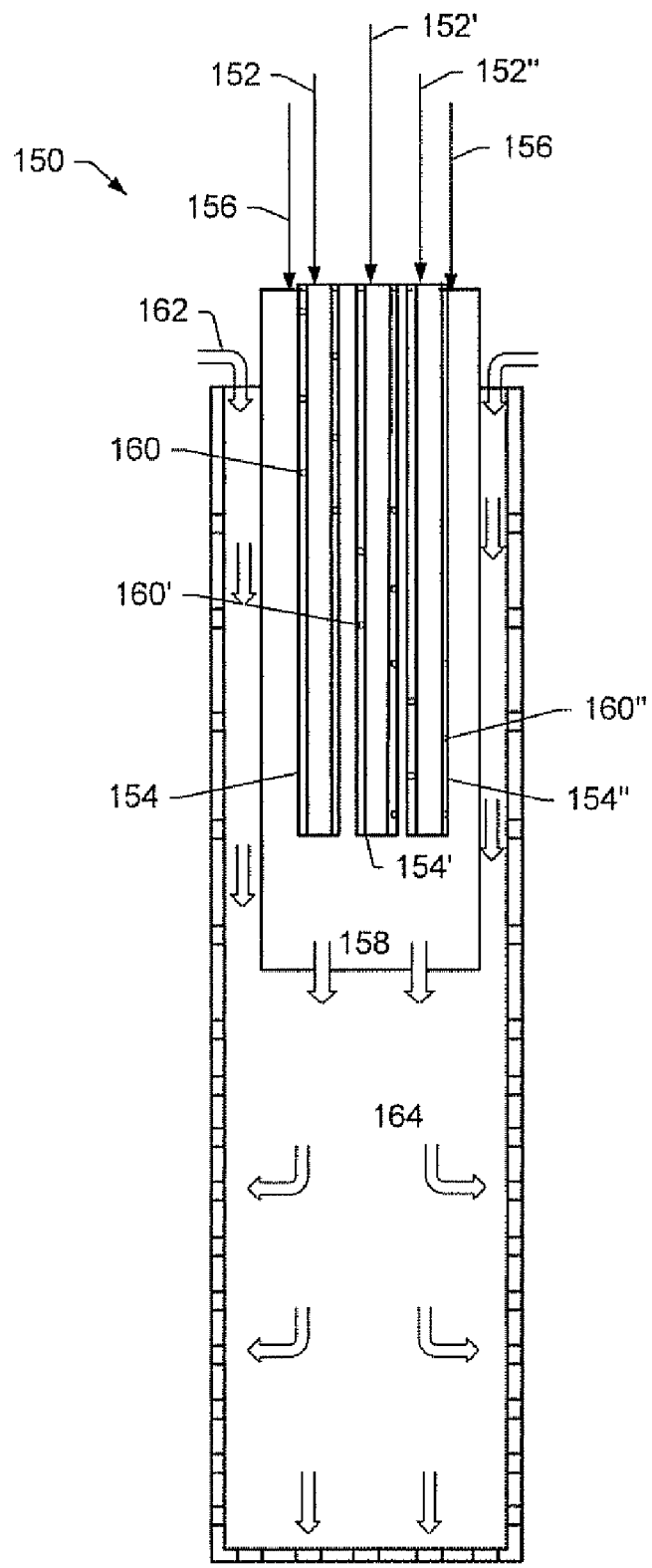
FIG. 5 depicts a cross-sectional representation of a portion of an embodiment of a hydrogen sulfide fueled flameless distributed combustor with three fuel conduits.
Figure 6:
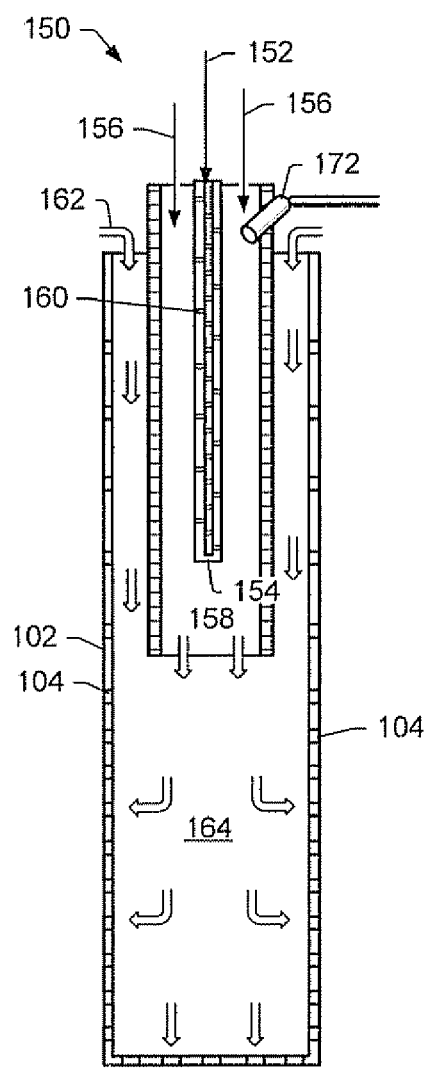
FIG. 6 depicts a cross-sectional representation of a portion of an embodiment of a hydrogen sulfide fueled flameless distributed combustor with an ignition source positioned in a vertical wellbore.
Figure 7:
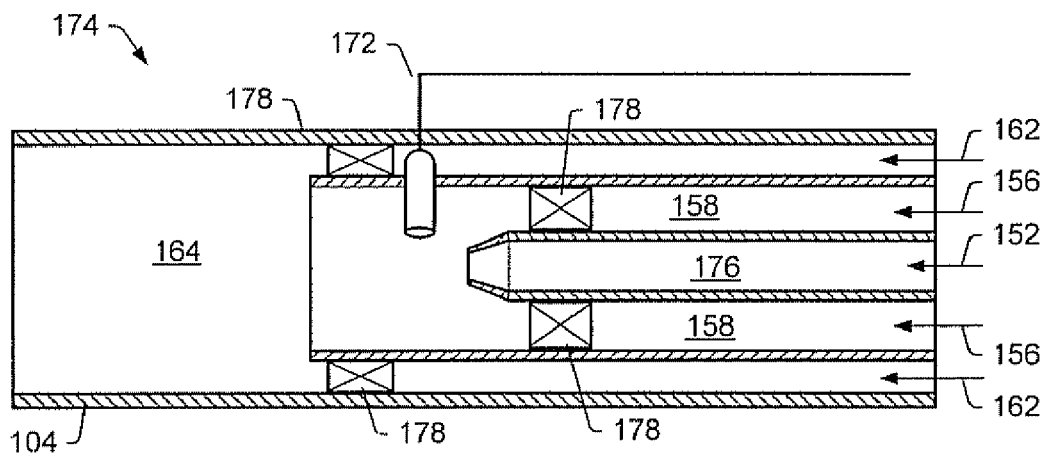
FIG. 7 depicts a cross-sectional representation of a portion of an embodiment of a hydrogen sulfide fueled burner positioned in a horizontal wellbore.

FIGS. 3 through 7 are embodiments of hydrogen sulfide fueled heaters 130 for subsurface heating. FIGS. 3 through 6 depict cross-sections of hydrogen sulfide fueled flameless distributed combustors. FIG. 7 depicts a cross-section of a hydrogen sulfide fueled burner that may be used in conjunction with a flameless distributed combustor in the process of the present invention.

Figure 3:
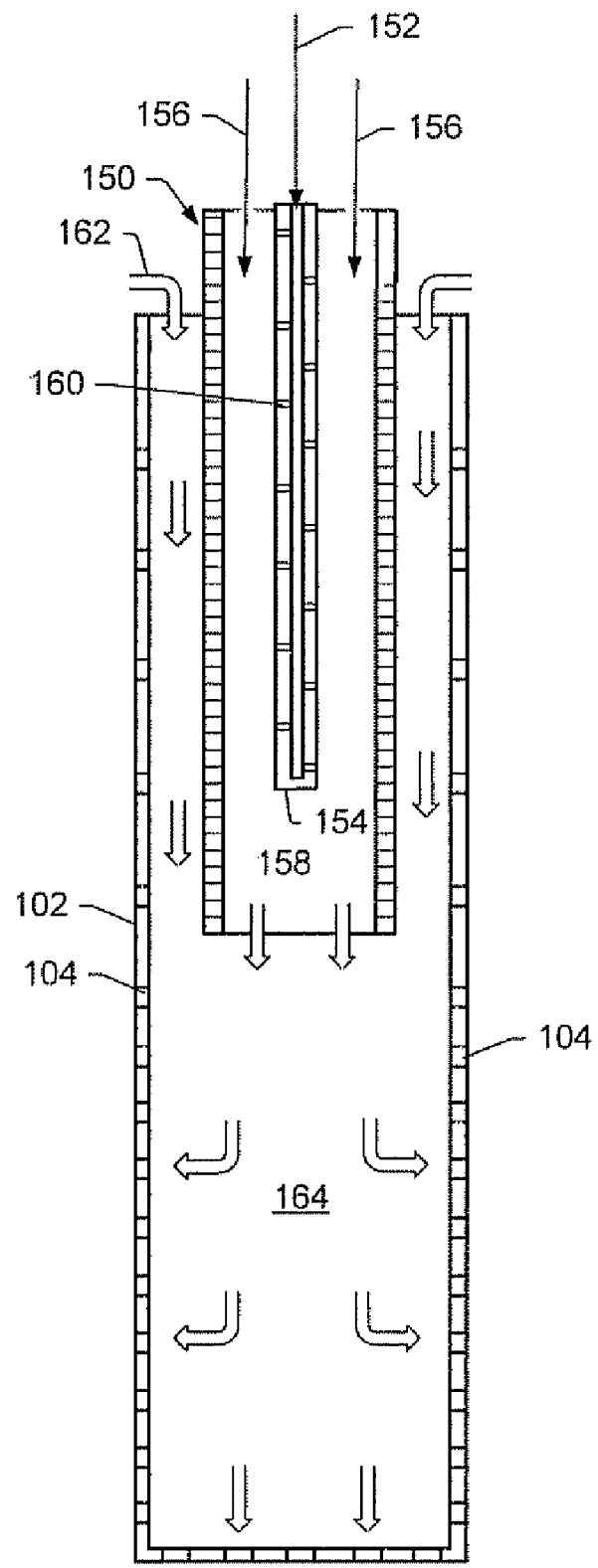
FIG. 3 depicts a cross-sectional representation of a portion of an embodiment of a hydrogen sulfide fueled flameless distributed combustor positioned in a vertical wellbore.

FIG. 3 depicts a perspective of a portion of hydrogen sulfide fueled flameless distributed combustor 150 positioned in vertical wellbore 102. Fuel stream 152 comprising hydrogen sulfide (for example, gas stream 116 and/or hydrogen sulfide stream 124 optionally including sulfur dioxide stream 128, hydrogen stream 130, and/or gas hydrocarbon stream 122 from FIG. 2) enters central fuel conduit 154. Oxidant stream 156 (for example, air, oxygen enriched air, oxygen gas, or mixtures thereof) enters combustion conduit 158. In some embodiments, heat from the stream comprising water 162 heats fuel stream 152, oxidant stream 156, and/or the fuel/oxidant mixture to a temperature at or above the auto-ignition temperature necessary to cause combustion of the fuel stream mixture. In some embodiments, fuel stream 152 and/or oxidant stream 156 are heated prior to entering the fuel conduit and/or combustion conduit to a temperature at or above the auto-ignition temperature of the mixture. Oxidant stream 156 and fuel stream 152 mix, and the fuel/oxidant mixture reacts (combusts) at a temperature at or above the auto-ignition temperature of the mixture.

Central fuel conduit 154 is positioned inside of combustion conduit 158 and may extend the length of flameless distributed combustor 150. Central fuel conduit 154 includes orifices 160 along the length of the central fuel conduit. Orifices 160 may be critical flow orifices. Orifices 160 allow heated fuel to mix with heated oxidant so that the mixture reacts (flamelessly combusts) to produce heat. In some embodiments, orifices 160 are shaped to allow a fuel to oxidant momentum ratio to range from 10 to 100, from 30 to 80, or from 50 to 70, where momentum is equal to the density of the fuel or oxidant times velocity of the fuel or oxidant squared. In some embodiments, a fuel to oxidant pressure ratio through orifices 160 ranges from 1.5 to 2.

Combustion in a downstream portion of combustion conduit 158 may transfer heat to the stream comprising water 162 in outer conduit 164. In some embodiments, the water is heated to form steam and/or super heated steam. Outer conduit 164 may be the space formed between the inner wall of injection well 102 and outer wall of combustion conduit 158. Outer conduit 164 may include openings 104 that allow the stream comprising water and/or heat to enter the hydrocarbon layer adjacent to the injection well. In some embodiments, outer conduit 164 is a conduit that surrounds combustion conduit 158 and is coupled to or an integral part of flameless distributed combustor 150. Coupling outer conduit 164 to flameless distributed combustor 150 may facilitate insertion of the flameless distributed combustor into an existing injection well.

In some embodiments, combustion of fuel in combustion conduit 158 produces a combustion by-products stream. Combustion by-products stream may heat the stream comprising water 162. The combustion by-products stream may exit openings 104 and drive, heat, and/or reduce viscosity of formation fluids in the hydrocarbon containing formation. Contact of water with the combustion by-products stream in a portion of the formation at a distance from well 102 may generate heat, and heat at least a portion of the formation to allow fluids to be mobilized.

In some embodiments, a portion or portions of central fuel conduit 154 are adjustable. The ability to adjust central fuel conduit 154 allows fuel to be provided to selected portions of combustion conduit 158. For example, positioning central fuel conduit 154 at an upstream portion of the flameless distributed combustor may facilitate the combustion process in the upstream portion of the well at a desired time. Once combustion is established, the fuel conduit may be advanced along the length of the injection well (or selected valves may be opened along the length of the injection well) to provide fuel to other combustors positioned in the well. In some embodiments, orifices 160 may be adjusted to allow flow of fuel into combustion conduit 158. For example orifices, 160 may be connected to a computer system that opens and/or closes the orifices as required.

Figure 4:
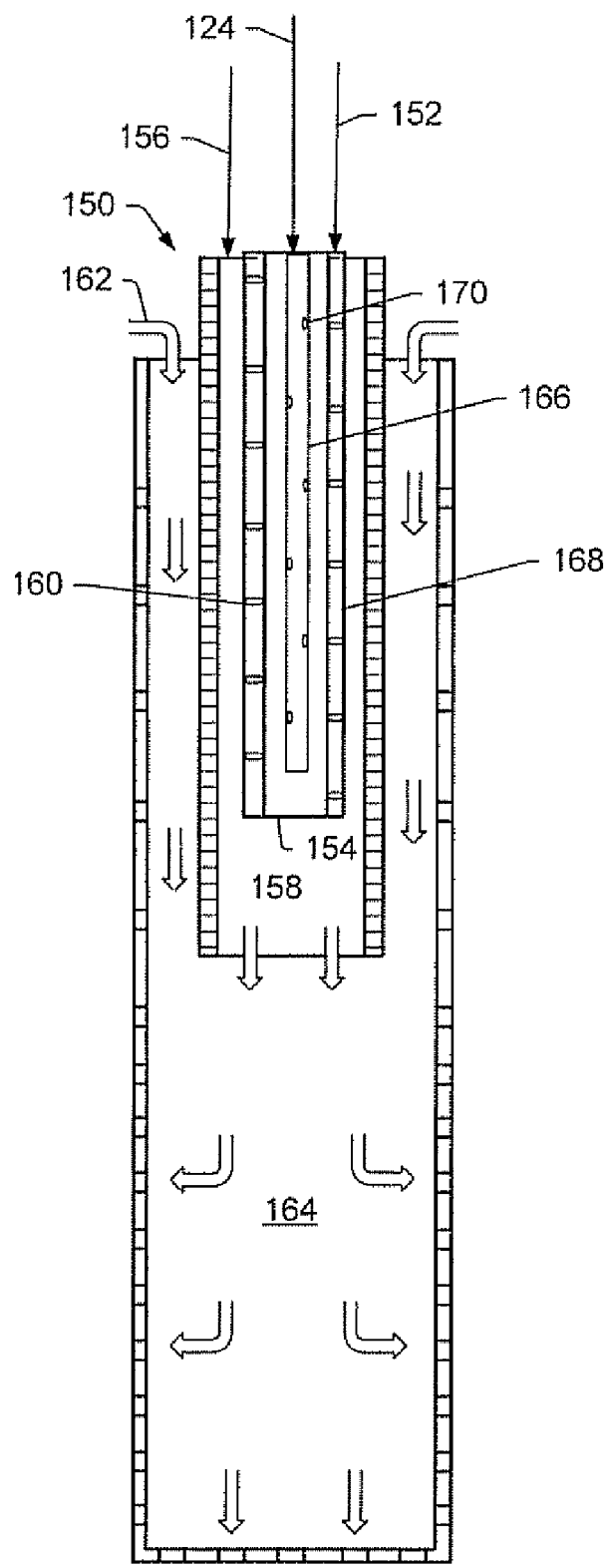
FIG. 4 depicts a cross-sectional representation of a portion of an embodiment of a hydrogen sulfide fueled flameless distributed combustor with two fuel conduits.

FIG. 4 depicts central fuel conduit 154 having inner fuel conduit 166 and outer fuel conduit 168. Inner fuel conduit 166 may be coupled and/or removably coupled to outer fuel conduit 168. Inner fuel conduit 166 may fit inside of outer fuel conduit 168 such that a space is formed between the two conduits. In some embodiments, the two conduits are coaxial. In some embodiments, the conduits are separate and parallel.

Hydrogen sulfide stream 124 enters inner fuel conduit 166 and flows into outer fuel conduit 168 through orifices 170. In some embodiments, hydrogen sulfide is delivered to outer fuel conduit 168 through an opening in a downstream portion (for example, the end of fuel conduit is open) of inner fuel conduit 166. Fuel stream 152 enters outer fuel conduit 168. In some embodiments, a portion of inner fuel conduit 166 relative to outer fuel conduit 168 is adjustable to allow for removal of either of the conduits for maintenance purposes, and/or for selected delivery of hydrogen sulfide and/or fuel to selected portions of the flameless distributed combustor. Delivery of hydrogen sulfide as a separate stream may allow for control of the amount of hydrogen sulfide in the fuel stream provided to combustion conduit 158. In some embodiments, outer conduit 168 is the hydrogen sulfide conduit and fuel is delivered to the formation through inner conduit 166.

FIG. 5 depicts flameless distributed combustor 150 having more than one fuel conduit. As shown, the fuel conduits are separate and parallel to one another. In some embodiments, the conduits are co-axial. Fuel conduits 154, 154', 154" include orifices 160, 160', 160" positioned at different intervals along the fuel conduits. Positioning of the orifices 160, 160', 160" may allow for delivery of fuel to selected portions of flameless distributed combustor 150 at selected time periods. For example, fuel stream 152 may be delivered to an upstream portion of combustion conduit 158 through orifice 160. Combustion of fuel 152 in the upstream portion of the combustion conduit 158 may provide heat to steam 162 in upstream portion of outer conduit 164. Fuel stream 152' enters a middle portion of combustion conduit 158 through orifices 160', mixes with oxidant, and then react to provide heat to steam in a middle portion of outer conduit 164. Fuel stream 152" delivered through orifices 160" in fuel conduit 154" and subsequent combustion in downstream portion of combustion conduit 158 provides heat to steam in a downstream portion of outer conduit 164. In some embodiments, fuel streams 152, 152', 152" contain different amounts of hydrogen sulfide. In some embodiments, fuel streams 152, 152', 152" contain the same amounts of hydrogen sulfide. It should be understood that the number of fuel conduits and/or position of the orifices in the fuel conduit may be varied. In some embodiments, orifices 160, 160', 160" are adjusted (opened and/or closed) to control the flow of fuel and/or hydrogen sulfide into combustion conduit 158.

FIG. 6 depicts a cross-section of flameless distributed combustor 150 with ignition device 172. Ignition device 172 may raise the temperature of the fuel/oxidant mixture to combustion temperatures in combustion conduit 158. For example, once the fuel/oxidant mixture is ignited near ignition device 172, heat from the flame heats the fuel/oxidant mixture to an auto-ignition temperature of the fuel/oxidant mixture to facilitate the reaction of the fuel with the oxidant to produce flameless combustion and heat.

FIG. 7 depicts a perspective of hydrogen sulfide fueled burner 174 that may be used in conjunction with a flameless distributed combustor in the process of the present invention. Burner 174 may include fuel conduit 176, combustion conduit 158, and outer conduit 164. Ignition device 172 may be positioned in a bottom portion of combustion conduit 158. Fuel stream 152 (for example, gas stream 116, hydrogen sulfide stream 124, sulfur dioxide stream 128, hydrogen stream 130, and/or gas hydrocarbon stream 122 from FIG. 2, (methane, natural gas, sour gas, or mixtures thereof) enters central fuel conduit 176. Oxidant stream 156 (for example, air, oxygen enriched air, or mixtures thereof) enters combustion conduit 158. In some embodiments, burner 174 may include more than one fuel conduit. For example, one conduit for hydrogen sulfide and one conduit or a fossil fuel. In some embodiments, fuel conduit 176 is combustion conduit 158 and combustion conduit is fuel conduit 176.

In some embodiments, fuel stream 152 and/or oxidant stream 156 are heated prior to entering the fuel conduit and/or combustion conduit. In some embodiments, water 162 heats fuel stream 152 and/or oxidant stream 156. Fuel stream 152 and oxidant stream 156 mix in combustion conduit 158. Ignition device 172 provides a spark to combust the fuel/oxidant mixture to produce a flame.

In some embodiments, burner includes one or more nozzles 178. The fuel and oxidant may be mixed by flowing at least a portion of the fuel and at least a portion of the oxidant through nozzles 178. Nozzles 178 may enhance mixing in combustion conduit 158 and/or outer conduit 164. Geometry of nozzles 178 (for example, converging-diverging section dimensions, length, diameter, and/or flare angle) may be adjusted based on firing rate, fuel stream composition, and/or oxidant stream composition. A nozzle flare angle may range from 1 degree to 10 degrees, from 2 degrees to 9 degrees, or from 3 degrees to 8 degrees in the flow direction. In some embodiments, nozzles 178 are shaped to allow concentric flow or counter-concentric flow (swirling of the mixture). The nozzle swirl angle may range from 10 degrees to 40 degrees, from 15 degrees to 35 degrees, or from 20 degrees to 30 degrees. In some embodiments, the nozzle swirl angle is 30 degrees. In some embodiments, burner 174 does not include nozzles 178.

In some embodiments, a downstream portion of fuel conduit 176 may be tapered. The taper angle may range from 5 to 30 degrees, from 10 degrees to 25 degrees, or from 15 degrees to 20 degrees.

Combustion of the fuel/oxidant mixture in combustion conduit 158 of burner 174 may transfer heat to the stream comprising water 162 in outer conduit 164. In some embodiments, the water is heated to form steam and/or super heated steam. Outer conduit 164 may be the space formed between the inner wall of injection well 102 and outer wall of combustion conduit 158. Outer conduit 164 may include openings 104 that allow the stream comprising water and/or heat to enter the hydrocarbon layer adjacent to the injection well. In some embodiments, outer conduit 164 is a conduit that surrounds combustion conduit 158 and is coupled to or an integral part of burner 174. Coupling outer conduit 164 to burner 174 may facilitate insertion of the burner into an existing injection well. In some embodiments, the outer conduit is the fuel conduit and water is delivered through the inner conduit.

In some embodiments, combustion of the fuel/oxidant mixture in combustion conduit 158 of burner 174 produces the combustion by-products stream. Combustion by-products stream may heat water 162. The combustion by-products stream may exit openings 104 and drive, heat, and/or reduce viscosity of formation fluids in the hydrocarbon containing formation. Contact of water with the combustion by-products stream in a portion of the formation at a distance from well 102 may generate heat and heat at least a portion of the formation to allow fluids to be mobilized.

Heaters 130 (for example, flameless distributed combustors and burners described in FIGS. 3-7) may be manufactured from materials suitable for downhole combustion processes. In some embodiments, water present in the fuel and/or hydrogen sulfide streams interacts with hydrogen sulfide to form a sulfide layer on metal surfaces of the conduit walls. Formation of the sulfide layer may inhibit further corrosion of the metal surfaces of the conduit walls by carbonic acid and/or other acids. The formation of the sulfide layer may allow outer conduit 164, central fuel conduit 154, and combustion conduit 158 to be fabricated from carbon steel or other alloys. For example, alloy 230, alloy 800H, alloy 370H or Hastelloy C276 may be used to manufacture portions of heaters 130. In some embodiments, inner fuel conduit 166 (shown in FIG. 4) is manufactured from materials resistant to high temperature and/or high concentrations of hydrogen sulfide.

In some embodiments, a start-up mixture of hydrocarbon fuel containing a minimal amount of hydrogen sulfide or a less than a stoichiometric amount of hydrogen sulfide relative to the amount of oxidant is introduced into fuel conduit 154 of heaters 130 (for example, flameless distributed combustor 150 and/or burner 174). In some embodiments, a start up fuel stream includes at most 1%, at most 0.5%, at most 0.01% by volume of hydrogen sulfide. In some embodiments, the start-up fuel includes hydrogen and/or oxygenated ethers such as dimethyl ether to lower the ignition temperature. Once combustion has been initiated, the hydrogen sulfide concentration in fuel stream 152 may be increased.

In some embodiments, a mixture containing a low amount of hydrogen sulfide relative to oxidant is not necessary for start-up and/or for sustaining combustion. For example, the fuel stream may include from 0.1% to 100%, from 5% to 90%, from 10% to 80%, or from 20% to 50% of hydrogen sulfide by volume. In some embodiments, the fuel has a sulfur content of at least 0.01 grams, at least 0.1 grams, at least 0.5 grams or at least 0.9 grams of atomic sulfur per gram of fuel as determined by ASTM Method D4294.

Figure 8:
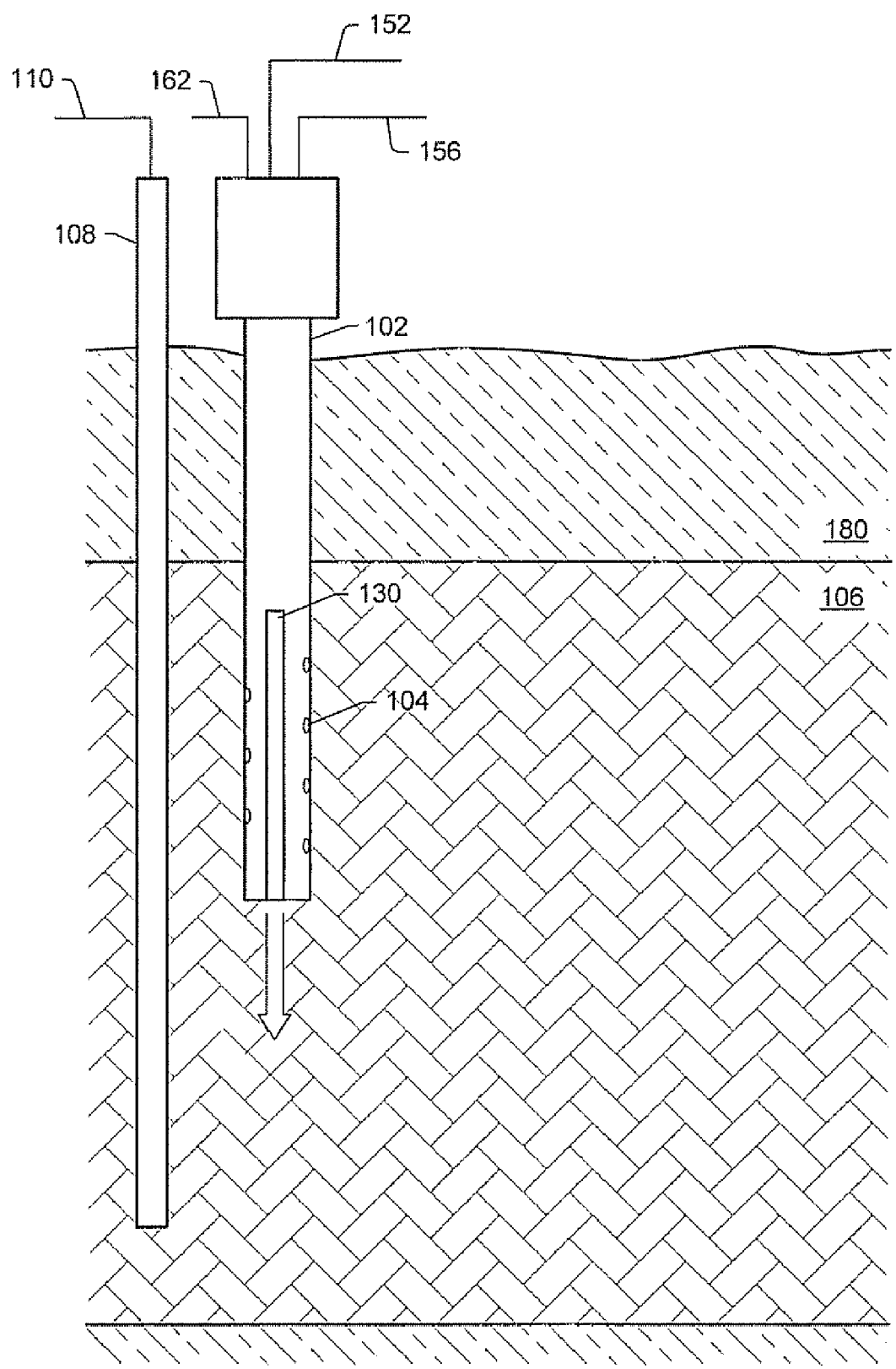
FIG. 8 depicts a representation of an embodiment for producing hydrocarbons from a hydrocarbon containing formation using a hydrogen sulfide fueled heater.

FIG. 8 depicts a representation of an embodiment for producing hydrocarbons from a hydrocarbon containing formation (for example, a tar sands formation). Hydrocarbon layer 106 includes one or more portions with heavy hydrocarbons. Hydrocarbon layer 106 may be below overburden 180. Hydrocarbons may be produced from hydrocarbon layer 106 using more than one process.

Hydrocarbons may be produced from a first portion of hydrocarbon layer 106 using a steam injection process and/or other drive process (for example, a carbon dioxide drive process). The steam injection process may include steam drive, cyclic steam injection, SAGD, or other process of steam injection into the formation. A portion of hydrocarbon layer 106 may be treated using heaters prior to the steam injection process. Heaters may be used to increase the temperature and/or permeability of the portion of hydrocarbon layer 106. Some hydrocarbons may be produced through production well 108 by heating the hydrocarbon portion. Alternatively, hydrocarbon layer 106 may not be heated prior to steam injection. The production well 108 may be located at a depth of 100, 200, 500, 1000, 1500, 2500, 5000, 10000, or 10500 meters. The pattern and number of injection wells, heater wells and production wells may be any number or geometry sufficient to achieve production of formation fluids from a hydrocarbon containing formation.

Injection well 102 may include heater 130 or a series of heaters. The heaters 130 may be inserted in injection well 102 after some hydrocarbons have been produced from hydrocarbon layer 106. The injection well 102 may be located at a depth of below 100, 200, 500, 1000, 1500, 2500, 5000, or 10000 meters. Heating or injecting drive fluids at shallow depths of a formation may allow recovery of hydrocarbons that are not readily accessible through conventional steam drive processes and/or thermal heating using heaters. Heating or injecting drive fluids in a hydrocarbon containing formation at shallow depths may also allow recovery of hydrocarbons that are not readily accessible through conventional hydrocarbon recovery methods.

The injection well 102 may be fabricated from materials known in the art to be resistant to sulfur oxides. For example, injection well 102 may be made from Hastelloy® C276, alloy 230, alloy 800H, alloy 370H, nickel/copper/iron alloys, or cobalt-chromium alloys.

A stream comprising water 162 (for example, steam and/or hot water) may be injected into injection well 102. Water may be injected at temperatures of at least 200° C., at least 225° C., at least 250° C., or at least 260° C. and pressures ranging from about 1 MPa to about 15 MPa. Fuel stream 152 and oxidant stream 156 enter heaters 130 comprising flameless distributed combustors. Combustion of a fuel/oxidant mixture in heaters 130 may heat water 162 and/or heat a portion of hydrocarbon containing layer 106. Heat from water 162 may be sufficient to auto ignite the fuel/oxidant mixture.

Heat produced during combustion of the fuel/oxidant mixture in combustion conduit 158 transfers heat to the stream comprising water 162. The heated stream comprising water 162 may flow into hydrocarbon layer 106 through openings 104. Heat and/or injectivity of steam, combustion gases and/or hydrogen sulfide may mobilize formation fluid in hydrocarbon layer 106 towards production wells. The ability to heat water 162 in the formation may allow for expanded and/or more uniform heating of hydrocarbon layer 106.

Heat from combustion and/or the heated stream comprising water 162 forms a first heated zone. Hydrocarbons in hydrocarbon layer 106 may be mobilized by the heat and produced from production well 108.

Combustion of the fuel comprising hydrogen sulfide/oxidant mixture produces a combustion by-products stream. The combustion by-products stream may include sulfur oxides such as sulfur trioxide and/or sulfur dioxide. Contacting (for example, mixing, solvating, and/or dissolving) of at least a portion of the sulfur oxides in water 162 may heat the water in well 102 and/or hydrocarbon layer 106 to form a second heated zone. The second heated zone may heat a portion of the hydrocarbon layer 106 proximate the end of injection well 102 and/or extend into hydrocarbon layer 106. Due to the heat transfer and more uniform heating of hydrocarbon layer 106, an increased amount of hydrocarbons may be produced per volume as compared to conventional drive fluid processes. The first and second heated zones may overlap.

In some embodiments, the second heated zone is a substantial distance from well 102. For example, combustion by-products may drive the steam into the formation. As steam condenses, the sulfur oxides in the combustion by-products react with the condensed water to generate heat from the formation of sulfuric acid. The generated heat may provide heat to the formation to sufficiently mobilize hydrocarbons towards production well 108. The combination of subsurface steam heating in combination with latent heating (heating after the steam condenses) may facilitate recovery of hydrocarbons from the formation. The combination of sensible heat for all introduced components and latent heat may reduce energy and/or heating requirements for producing hydrocarbons from the formation as compared to the energy and/or heating requirements for conventional hydrocarbon recovery processes.

The hydrocarbon formation may contain limestone. As the sulfur oxides contact the formation in the presence of water, the limestone reacts with the sulfur oxides and produces carbon dioxide. The carbon dioxide may serve as an additional drive fluid to push the fluids towards production well 108.

The sulfur oxides may react with aromatic hydrocarbons in the formation fluids and form sulfonates. The formation of in-situ sulfonates may facilitate moving hydrocarbons towards one or more production wells.

Formation fluids 110 produced from production well 108 may be treated in a surface facility (for example, in surface facilities described with respect to FIG. 2) to form a gas stream and a liquid stream. In some embodiments, the produced hydrocarbons have an API gravity of at most 15, at most 10, at most 8, or at most 6. The gas stream may include hydrogen sulfide, sulfur dioxide, hydrocarbon gases and/or carbon dioxide. In some embodiments, the sulfur dioxide is separated from the formation fluids using a regenerable process (for example, as described in FIG. 2). At least a portion of the sulfur dioxide may be introduced into the outer conduit 164 and/or into the hydrocarbon containing formation. In some embodiments, formation fluids that include least a portion of the sulfur dioxide from the hydrocarbon containing formation are produced and separated from the formation fluids. At least a portion of the separated sulfur dioxide may be provided to the hydrocarbon containing formation and/or at least one of the flameless distributed combustors.

All or a portion of the gas stream 116 may be transferred to fuel stream 152 and combusted in heater 130. In some embodiments, fuel stream 152 includes sulfur dioxide. In the presence of oxidant in heater 130, at least a portion of the sulfur dioxide may be converted to sulfur trioxide and subsequently converted to sulfuric acid in the formation. In some embodiments, at least a portion of sulfur dioxide enters the formation. By recycling the sulfur dioxide, a majority of sulfur emissions produced from the formation and/or from surface facilities are abated, thus reducing emissions as compared to emissions (for example, carbon dioxide) generated by combustion of fossil fuels make steam for steam flooding.

In some embodiments, the stream comprising water 162 includes one or more surfactants and/or one or more foaming agents. Surfactants include thermally stable surfactants (for example, sulfates, sulfonates, alkyl benzene sulfonates, ethoxylated sulfates, and/or phosphates). The use of foaming agents and/or surfactants may change the surface tension between the hydrocarbons and the formation to allow the hydrocarbons to be mobilized towards production well 108. In some embodiments, the stream comprising water 162 includes an antifoaming agent. The antifoaming agent may inhibit foaming of the formations fluids when carbon dioxide and surfactants are present.

In some embodiments, the stream comprising water 162 introduced into hydrocarbon layer 106 includes hydrogen sulfide and or hydrogen. The hydrogen sulfide and/or hydrogen may solvate, dilute, and/or hydrogenate a portion of the heavy hydrocarbons to form a mixture that may mobilize formation fluid toward production well 108. Formation of the mixture may increase production of hydrocarbons in hydrocarbon layer 106. Solubilization, dilution, and/or hydrogenation of a portion of the heavy hydrocarbons may allow an increase in the amount of hydrocarbons produced from the hydrocarbon layer. The solvents and/or hydrogen sulfide may be separated from the mixture and injected with the stream comprising water 162 or used in other processes. For example, hydrogen sulfide may be separated from the mixture and combusted to heat water. In some embodiments, heat from hydrogenation of hydrocarbons transfers to a portion of hydrocarbon layer 106 and/or to the stream comprising water 162.

In some embodiments, heater 130 or a series of heaters are positioned in injection well 102. The stream comprising water 162, heated to at least 300° C., or at least 500° C., and pressurized to pressures ranging from 1 MPa to 15 MPa, may be introduced into well 102 and transfer heat to hydrocarbon layer 106. A portion of the stream comprising water 162 may enter hydrocarbon layer 106 through openings 104. The stream comprising water 162 may cool as it flows through outer conduit 164. Heaters positioned downstream of the wellhead may be ignited to heat the stream comprising water 162 as it flows through outer conduit 164. Heaters may heat the stream comprising water 162 to a temperature sufficient to heat hydrocarbon layer 106 (for example, to temperatures ranging from about 200° C. to about 500° C.). Formation fluids may be moved by the heat and/or the stream comprising water 162 towards production well 108. Temperatures in various portions of well 102 may be monitored. Heaters may be ignited at pre-determined temperatures in well 102. In some embodiments, water 162 is heated subsurface to form super heated steam.

In some embodiments, subsurface heating of the stream comprising water 162 increases a volume of a hydrocarbon containing layer to be heated as compared to heating using conventional steam injection methods. Subsurface heating allows the use of substantially liquid water and/or low pressure steam as a drive fluid instead of having to heat or pressurize steam at or above formation pressures prior to injection into the hydrocarbon containing formation. Subsurface heating of water in an injection well may create a steam reboiler along the length of the flameless distributed combustor. The ability to substantially heat the drive fluid (for example, steam) along the length of the heater may allow the hydrocarbon layer to be heated in a more uniform manner as compared to a system using a surface heated drive fluid. More uniform heating may allow production wells to be positioned at greater distances from the injection well as compared to conventional steam injection processes.

Figure 9:
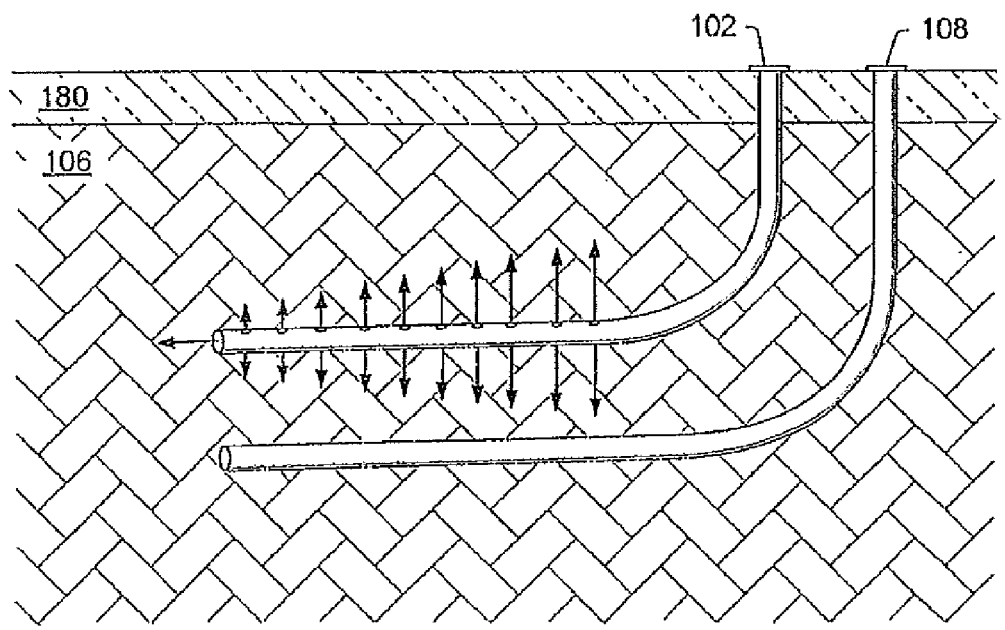
FIG. 9 depicts a representation of a heat flux profile of a conventional steam injection process.

In some embodiments, subsurface heating of water changes the heat flux profile of the system as compared to conventional drive fluid injection processes. FIG. 9 depicts a schematic of a heat flux profile of an embodiment of a conventional steam injection process. The injected steam in a conventional steam injection process flows to the end of injection well 102, the steam cools, and forms condensate as it moves towards portions of the well farthest from the injection site. Cooling of the steam decreases the amount of heat that is transferred to the hydrocarbon layer as indicated by the arrow length. Thus, heat transfer may be greatest at sections closest to wellhead relative to the end portions of the well.

In some embodiments, a method of treating a hydrocarbon containing formation, includes providing steam to at least a portion of a hydrocarbon containing formation from a plurality of locations in a wellbore, where the steam is hotter than a temperature of the portion of the hydrocarbon containing formation; and heating the steam in the wellbore by combusting at least a portion of a mixture that includes fuel and oxidant in the wellbore, where the fuel includes hydrogen sulfide. Heat from the combustion transfers to the steam; and the steam is heated such that the steam provided to the portion of the hydrocarbon containing formation at a first location in the wellbore is hotter than steam provided at a second location in the wellbore; and the first location is further from a surface of the formation than the second location along the length of the wellbore. In some embodiments, combustion generates a combustion by-products stream and at least a portion of the combustion by-products stream is contacted with a portion of the water in a portion of the hydrocarbon containing formation that is downstream of the formation surface, along the length of the wellbore, from the transferred heat portion. In some embodiments, at least a portion of the heat is transferred to at least a portion the hydrocarbon containing formation; and at least a portion of formation fluids are mobilized in the heated portion.

Figure 10A:
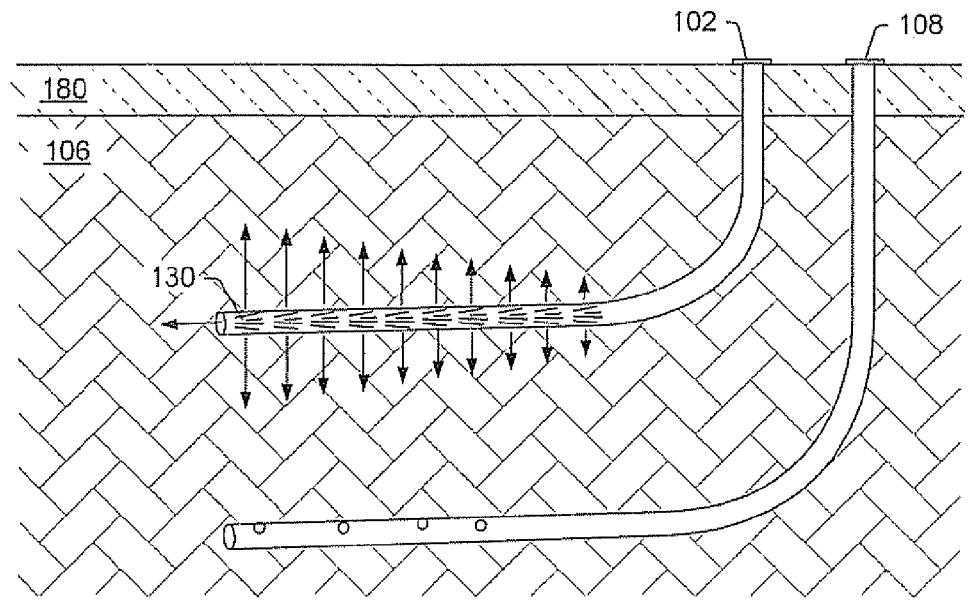
FIGS. 10A and 10B depict representations of a heat flux profile of an embodiment of heating of steam using a hydrogen sulfide fueled heater.
Figure 10B:
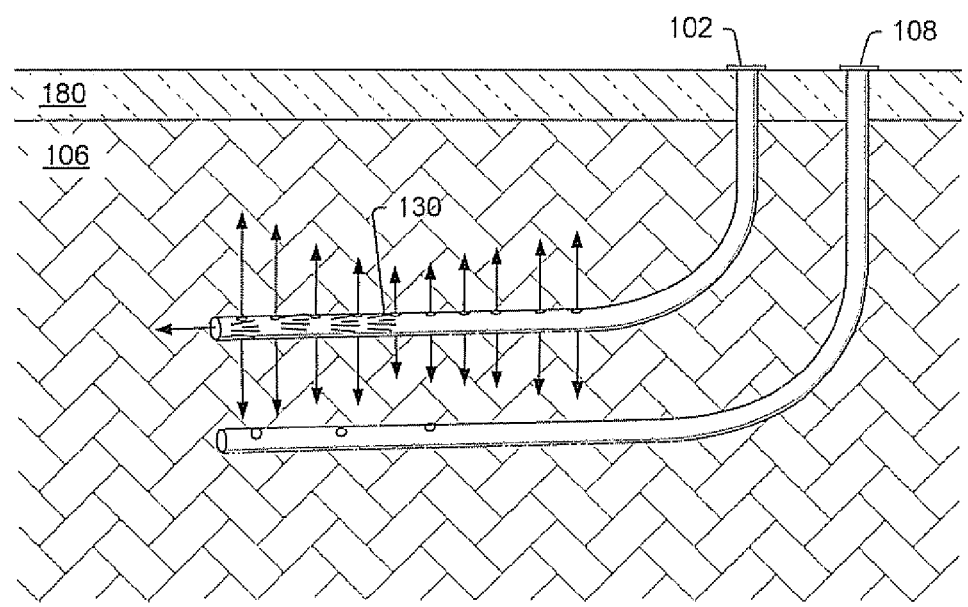

FIGS. 10A and 10B depict schematics of a heat flux profile of an embodiment of subsurface heating of steam using heaters 130 in a horizontal injection well 102. As shown in FIG. 10A, longer arrows indicate more heat is generated at the downstream portion of the well than at the upstream portion of the well when using heaters 130 to heat water in the formation. As shown, steam 162 is heated such that the steam provided to the layer at the downstream portion of the wellbore is hotter than steam provided to the hydrocarbon containing formation near the upstream portion of the formation. By controlling where the hotter portion is along the length of the wellbore heat may be transferred in a uniform manner to the formation, thus the heat flux, hot spots and/or cold spots along the length of the wellbore may be controlled. Hydrocarbons mobilized by the heat and/or steam from injection well 102 are produced from production well 108. In some embodiments, the downstream portion of the wellbore is proximate to a portion of formation having more hydrocarbons per volume (richer in hydrocarbons), as compared to the first location, thus allowing heat to transfer to hydrocarbons that may be more difficult to produce using conventional steam drive processes. In some embodiments, production well 108 may include openings to allow the hydrocarbons to flow into the well.

As shown in FIG. 10B, a shape of the heat flux profile may be parabolic. Heated water enters injection well 102 and heats an upstream portion of the well. As the water cools the heat profile diminishes. As the water cools, the heaters in well 102 are ignited to reheat the water. Other heat flux profiles, such as a substantially constant heat flux, may be obtained by adjusting the portion of the openings and/or heaters.

By keeping temperatures of the steam along the length of the wellbore at a constant temperature, the fuel and oxidant temperatures along the length of the wellbore may be buffered, thus inhibiting temperature fluctuations (for example, formation of hot spots and/or cold spots) along the length of the heater. Inhibiting temperature fluctuations may sustain and/or enhance oxidation along the length of the heater. Such consistent heating of the wellbore may allow heat to transfer uniformly to the formation thus facilitating mobilization and/or production of formation fluids from the hydrocarbon containing formation.

Uniform transfer of heat to hydrocarbon layer 106 from injection well 102 using heaters 130 may facilitate mobilization of more hydrocarbons towards production well 108. The change in heat flux profile and more uniform heating of the hydrocarbon layer may allow production well 108 to be positioned at distances greater than those used for conventional drive fluid injection, thus allowing hydrocarbons in less accessible areas to be produced.

In some embodiments, production of hydrocarbons from a hydrocarbon containing layer is enhanced by heating an area with a hydrogen sulfide fueled heater located in a well proximate the end of one or more horizontal steam injection wells. The heat provided by the hydrogen sulfide fueled heater may enhance production of hydrocarbons from the hydrocarbon layer.

In some embodiments, a method of treating a hydrocarbon containing formation, includes: providing steam to at least a portion of a hydrocarbon containing formation from a plurality of substantially horizontal steam injection wells; combusting at least a portion of a mixture that includes hydrogen sulfide and oxidant in one or more flameless distributed combustors positioned in one or more substantially vertical wellbores to generate heat, where at least one of the substantially vertical wellbores is within ten meters of an end of at least one of the substantially horizontal steam injection wells; allowing a portion of the generated heat to transfer to a portion of the hydrocarbon containing formation located between at least one of the substantially horizontal steam injection wells and at least one of the substantially vertical heater wells; and mobilizing at least a portion of formation fluids in the heated portion of the hydrocarbon containing formation. In some embodiments, the generated heat transfers to the portion by conduction, convention or by heat of solution. wherein the generated heat transfers to the portion by convection.

In some embodiments, a portion of the steam is heated by combusting at least a portion of the mixture in one or more flameless distributed combustors positioned in at least one of the substantially horizontal steam injection wells. In some embodiments, a portion of the steam is heated by combusting at least a portion of the mixture in one or more burners positioned in at least one of the substantially horizontal steam injection wells.

The steam transfers heat to at least a portion of the hydrocarbon containing formation. At least a portion of the steam may drive at least a portion of the formation fluids towards one or more production wells. Formation fluids may be produced from a volume between at least one of the substantially vertical heater wells and at least one of the substantially horizontal steam injection wells. In some embodiments, the hydrocarbon formation is heated prior to providing the water. In some embodiments, at least a portion of the combustion by-products is provided to the formation. At least a portion of the combustion by-products and/or at least a portion of the steam into the formation provide a driving force for mobilization of at least a portion of the formation fluids.

In some embodiments, the combustion by-products stream include sulfur oxides, and at least a portion of the combustion by-products steam is provided to the hydrocarbon containing formation such that at least a portion of the steam and a portion of the sulfur oxides mixes with water in the formation to generate heat of solution and at least a portion of the solution heat is transferred to a portion of the hydrocarbon containing formation.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method of treating a hydrocarbon containing formation, comprising:
   providing a stream comprising water to a plurality of wellbores positioned in a hydrocarbon containing formation wherein at least a portion of the water is steam and/or superheated steam;
   providing a fuel stream and an oxidant stream to one or more flameless distributed combustors positioned in at least one of the wellbores, wherein the fuel stream has a hydrogen sulfide content of at least 0.1% hydrogen sulfide by volume as determined by ASTM Method D2420;
   mixing at least a portion of the fuel stream and at least a portion of the oxidant stream to form a fuel/oxidant mixture; and
   flamelessly combusting at least a portion of the fuel/oxidant mixture in at least one of the flameless distributed combustors to generate heat.

2. The method of claim 1, further comprising transferring at least a portion of the generated heat to the stream comprising water to form a heated stream comprising water.

3. The method of claim 2, further comprising transferring at least a portion of the heat from the heated stream comprising water to a portion of the hydrocarbon formation to mobilize at least a portion of formation fluids in the hydrocarbon formation.

4. The method of claim 1, wherein at least a portion of the hydrogen sulfide is produced from formation fluids produced from the hydrocarbon containing formation.

5. The method of claim 1, wherein at least a portion of the water is provided to an outer portion of at least one of the wellbores, and at least one of the flameless distributed combustors is in an inner portion of the wellbore, and the inner portion of the wellbore communicates with the outer portion of the wellbore such that at least a portion of the generated heat provides heat to a portion of the water to form steam.

6. The method of claim 1, wherein at least a portion of the water is in the form of steam and the steam heats at least a portion of the fuel/oxidant mixture to a temperature at or above the auto-ignition temperature of the mixture.

7. The method of claim 1, wherein at least a portion of the water is provided to an outer portion of at least one of the wellbores, and at least one of the flameless distributed combustors is in an inner portion of the wellbore, and the inner portion of the wellbore communicates with the outer portion of the wellbore such that at least a portion of the generated heat provides heat to a portion of the water to form steam and the steam heats at least a portion of the fuel/oxidant mixture to a temperature at or above the auto-ignition temperature of the mixture.

8. The method of claim 1, wherein combustion generates combustion by-products comprising sulfur dioxide, and the method further comprises mixing at least a portion of formation fluids in the hydrocarbon containing formation with the sulfur dioxide to form a mixture; and mobilizing the mixture.

9. The method of claim 1, wherein providing fuel and/or oxidant comprises controlling a ratio of hydrogen sulfide to the oxidant such that, during combustion, a selected amount of hydrogen sulfide, sulfur trioxide, sulfur dioxide, or mixtures thereof is formed.

10. The method of claim 1, wherein the oxidant is oxygen, air, enriched air, or mixtures thereof.

11. The method of claim 1, wherein the stream comprising water further comprises a component selected from the group consisting of carbon dioxide, sulfur dioxide, combustion by-products from surface facilities, or mixtures thereof.

12. The method of claim 1 further comprising burning at least a portion of the mixture of the fuel stream and oxidant stream in one or more heaters located in one or more of the wellbores to which the stream comprising water is provided.

* * * * *